(12) United States Patent
Bishop

(10) Patent No.: US 9,496,808 B2
(45) Date of Patent: Nov. 15, 2016

(54) METHOD AND APPARATUS FOR MASKING A PORTION OF A COMPONENT

(75) Inventor: Jeffrey C. Bishop, Derby (GB)

(73) Assignee: ROLLS-ROYCE plc, London (GB)

( * ) Notice: Subject to any disclaimer, the term of this patent is extended or adjusted under 35 U.S.C. 154(b) by 482 days.

(21) Appl. No.: 13/364,684

(22) Filed: Feb. 2, 2012

(65) Prior Publication Data

US 2012/0225209 A1    Sep. 6, 2012

(30) Foreign Application Priority Data

Mar. 2, 2011    (GB) .................................. 1103517.7

(51) Int. Cl.
| | | |
|---|---|---|
| C23C 4/00 | (2006.01) | |
| H02P 1/06 | (2006.01) | |
| B05B 15/04 | (2006.01) | |
| C23C 8/04 | (2006.01) | |
| C23C 10/04 | (2006.01) | |

(52) U.S. Cl.
CPC ................ *H02P 1/06* (2013.01); *B05B 15/045* (2013.01); *C23C 4/01* (2016.01); *C23C 8/04* (2013.01); *C23C 10/04* (2013.01); *Y10T 29/49826* (2015.01); *Y10T 29/53961* (2015.01)

(58) Field of Classification Search
USPC ......................................................... 29/281
See application file for complete search history.

(56) References Cited

U.S. PATENT DOCUMENTS

| | | | | |
|---|---|---|---|---|
| 3,669,060 | A | * | 6/1972 | Page et al. .................... 118/663 |
| 5,348,506 | A | | 9/1994 | Kawamura et al. |
| 5,565,035 | A | * | 10/1996 | Sylvestro et al. ............ 118/721 |
| 5,839,641 | A | * | 11/1998 | Teng ............................... 228/41 |
| 6,135,050 | A | * | 10/2000 | Inaba et al. .................... 118/301 |
| 2001/0032870 | A1 | * | 10/2001 | Nakamura .................... 228/156 |
| 2004/0135498 | A1 | * | 7/2004 | Takanosu et al. ............ 313/504 |
| 2009/0053422 | A1 | | 2/2009 | Strock et al. |
| 2009/0260566 | A1 | * | 10/2009 | Landgraf et al. ............. 118/504 |

FOREIGN PATENT DOCUMENTS

| | | |
|---|---|---|
| GB | 2 352 991 A | 2/2001 |
| JP | A-2003-68453 | 3/2003 |
| WO | WO 2006/067836 A1 | 6/2006 |

OTHER PUBLICATIONS

British Search Report dated Jul. 25, 2011 in British Patent Application No. 1103517.7.
Mar. 1, 2012 Search Report issued in European Patent Application No. 12 15 3696.

* cited by examiner

*Primary Examiner* — Robert Vetere
(74) *Attorney, Agent, or Firm* — Oliff PLC

(57) ABSTRACT

A method and apparatus (2) for masking a portion (36) of a component (30), the apparatus (2) comprising: a sacrificial masking element (4) for masking the portion (36); and a locating jig (6) detachably connectable to the sacrificial masking element (4) and configured to position the sacrificial masking element (4) over the portion (36) of the component (30).

10 Claims, 3 Drawing Sheets

METHOD AND APPARATUS FOR MASKING
A PORTION OF A COMPONENT

The present invention relates to a method and apparatus for masking a portion of a component and particularly, but not exclusively, to a method and apparatus which allows a plurality of components to be masked both quickly and accurately.

BACKGROUND

It is known to apply a Thermal Barrier Coating (TBC) to a surface of a component which operates at an elevated temperature. Thermal barrier coatings typically have low thermal conductivity, and therefore, in use, display a large temperature gradient across the thickness of the coating. Accordingly, thermal barrier coatings provide thermal insulation to components and thus allow the components to operate under large and prolonged heat loads. Furthermore, thermal barrier coatings may extend the life of the component by reducing oxidation and by reducing cyclic loading caused by temperature variations which may result in thermal fatigue.

Thermal barrier coatings are commonly applied to metallic components which are subjected to high-temperature conditions. For example, thermal barrier coatings are widely used within gas turbine engines, particularly on combustor rings, nozzle guide vanes, turbine blades, etc.

Thermal barrier coatings may be applied to a component using a number of techniques. For example, a thermal barrier coating may be applied using a physical vapour deposition technique (e.g. electron beam or laser beam deposition), direct vapour deposition, plasma spraying, electrostatic spray assisted vapour deposition, etc.

It is known to provide an interior surface of a circular combustor ring with a thermal barrier coating. To achieve this, the combustor ring is located within a TBC spray-chamber with the TBC spray nozzle located approximately at the centre of the circular combustor ring and in alignment with the interior surface. The TBC spray nozzle and combustor ring may be rotated relative to one another, such that the thermal barrier coating from the TBC spray nozzle covers the entire circumferential interior surface. This may be achieved by rotating the combustor ring using a rotary table or by rotating the TBC spray nozzle.

However, for the purposes of assembling the combustor a circumferential portion of the interior surface of the combustor ring is left uncoated. Accordingly, this portion of the interior surface is covered by a special adhesive TBC-proof tape, which masks the portion from the thermal barrier coating. The application and subsequent removal of the adhesive tape is carried out by hand and as a result is a slow and correspondingly expensive procedure. Furthermore, the current method is wasteful since the tape (approximately 5 m of tape per combustor ring) is discarded after every use.

The present invention seeks to overcome some or all of the problems associated with the prior art method described above.

STATEMENTS OF INVENTION

In accordance with an aspect of the invention there is provided a method of masking a portion of a component, the method comprising: attaching a sacrificial masking element to a locating jig; and disposing the locating jig against a surface of the component such that the sacrificial masking element is positioned over the portion of the component.

The sacrificial masking element may be attached to the locating jig by a sacrificial connector; and the method may further comprise: inserting a deformable portion of the sacrificial connector through the sacrificial masking element, wherein the deformable portion is in an unlocked position, and deforming the deformable portion from the unlocked position to a locked position to lock the sacrificial masking element to the locating jig.

The deformable portion may be a pair of legs which are bendable from the unlocked position to the locked position.

The method may further comprise stacking a second component on top of the locating jig.

Further components may be stacked on top of one another with a locating jig disposed between adjacent components. This may allow a coating to be applied to a plurality of components in a single operation. This may be particularly advantageous where the coating is applied in a vacuum chamber (e.g. for electron beam deposition), since the invention reduces the number of times the chamber must be evacuated.

The sacrificial masking element may also mask a portion of the second component.

The method may further comprise applying a coating to the component. The sacrificial masking element may prevent the coating from contacting the masked portion of the component.

The coating may be a thermal barrier coating.

In accordance with another aspect of the invention there is provided a masking apparatus, the apparatus comprising: a sacrificial masking element for masking a portion of a component; and a locating jig detachably connectable to the sacrificial masking element and configured to position the sacrificial masking element over the portion of the component.

The method and apparatus of the present invention may allow a portion of a component to be quickly and accurately masked. Furthermore, the present invention may reduce costs by using a sacrificial masking element which can be replaced without needing to replace the locating jig.

The locating jig may be detachably connectable to the sacrificial masking element via a sacrificial connector.

The locating jig may comprise a hole or slot for receiving the sacrificial connector.

The sacrificial connector may comprise a deformable portion which may be deformable from an unlocked position to a locked position to lock the sacrificial masking element to the locating jig.

This may allow the sacrificial masking element to be quickly and easily connected to and disconnected from the locating jig. The sacrificial connector may be deformed from the unlocked position to the locking position, and vice versa, by hand or using readily available tools.

The deformable portion may comprise a pair of legs which may be bendable between the unlocked position and locked position.

The locating jig may comprise a recess for receiving the sacrificial connector.

The recess may comprise a shoulder which abuts an end surface of a shoulder of the sacrificial connector. The shoulder of the recess may be gripped between the shoulder of the sacrificial connector and the sacrificial masking element when the sacrificial connector is in the locked position.

The sacrificial masking element may comprise a first layer and a second layer. The first layer may be disposed against the component and the second layer may be spaced away from the component by the first layer. The second layer may protrude over an edge of the first layer and thus may define the extent of the masked portion of the component.

This configuration may prevent a continuous film from forming between the second layer and the component which may otherwise cause the sacrificial masking element to become joined to the component.

The sacrificial masking element may be substantially perpendicular to the locating jig.

The locating jig and sacrificial masking element may be circular.

The locating jig may be formed from a plurality of arcuate sections.

This may allow individual arcuate sections to be replaced. Furthermore, the locating jig may be disassembled to reduce its size and may be assembled around the component where it is difficult to install the locating jig once it is fully assembled.

The locating jig may be formed from first and second layers of arcuate sections which may be rotated relative to one another and connected to one another.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
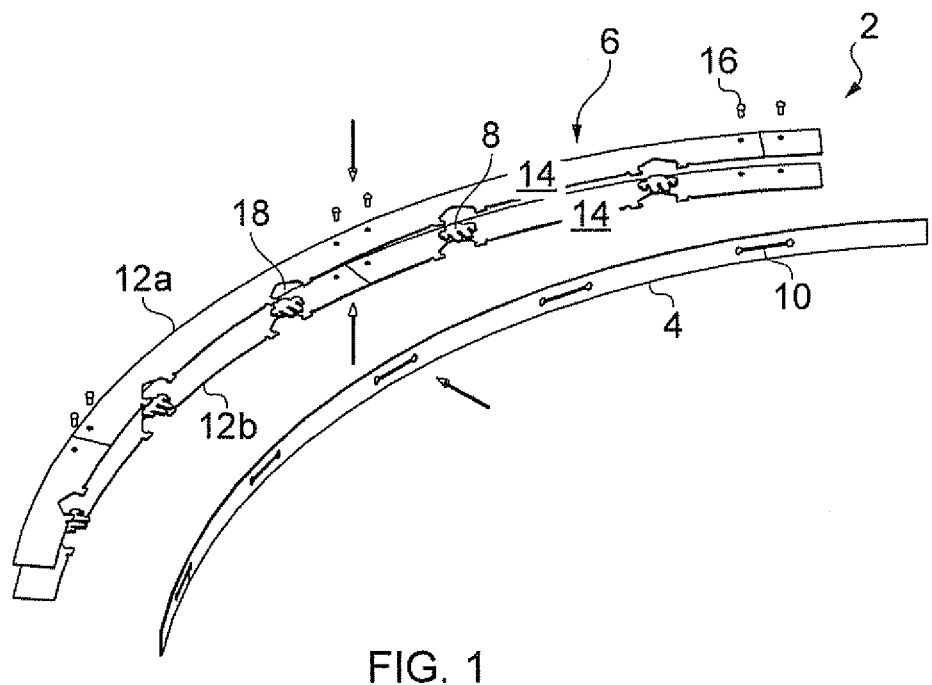
FIG. 1 is a perspective view of a section of a masking apparatus in accordance with an embodiment of the invention prior to assembly.

With reference to FIG. 1, a masking apparatus 2 in accordance with an embodiment of the invention comprises a circular sacrificial masking element 4, a circular locating jig 6, and a plurality of sacrificial connectors 8 which detachably connect the sacrificial masking element 4 to the locating jig 6.

Figure 5:
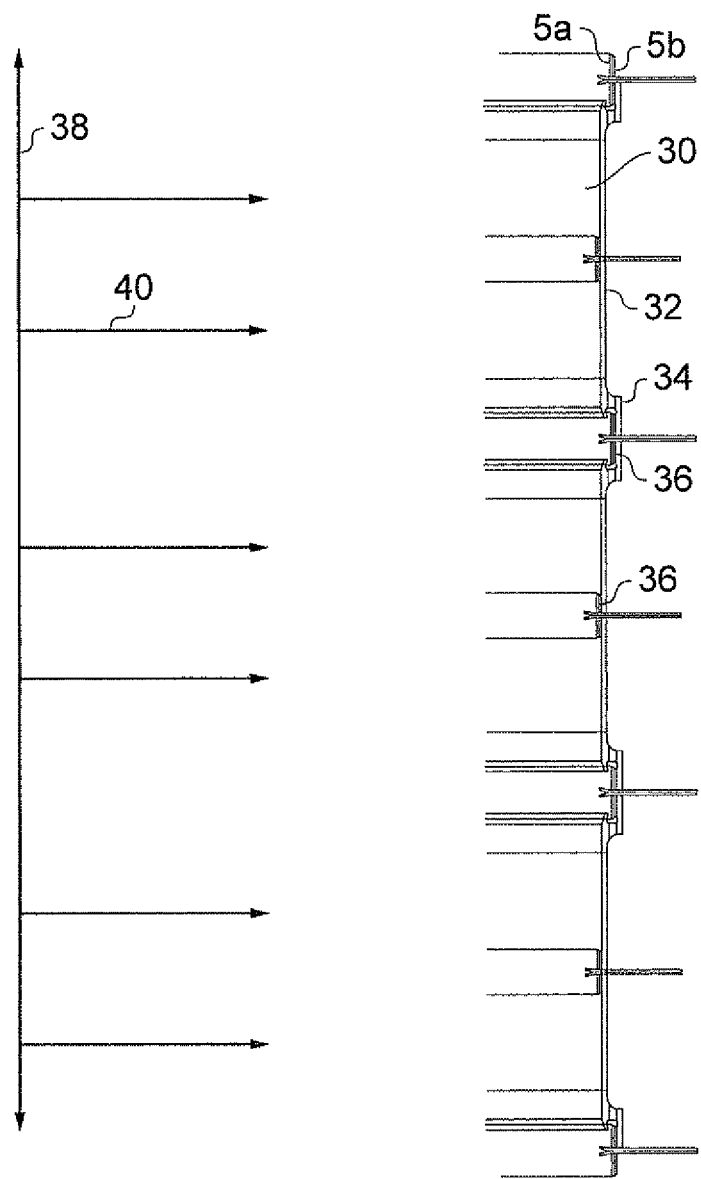
FIG. 5 is a cross-sectional view of a stack of combustor rings during a thermal barrier coating operation, where a portion of each combustor ring is masked by the masking apparatus.

The sacrificial masking element 4 is a circular ring of material having a plurality of circumferential slots 10 which pass through the sacrificial masking element 4 and are spaced around its circumference. The sacrificial masking element 4 is formed from an inner ring 5a and an outer ring 5b. The inner ring 5a has a slightly smaller diameter than the outer ring 5b. Furthermore, the inner ring 5a is longer than the outer ring 5b. The inner ring 5a is received within the outer ring 5b with the outer ring 5b located at the axial centre of the inner ring 5a. Accordingly, the inner ring 5a projects either side of the outer ring 5b and the inner and outer rings 5a, 5b contact one another (as shown in FIG. 5).

The locating jig 6 is formed from first and second locating rings 12a, 12b. The first and second locating rings 12a, 12b are in turn formed from a plurality of arcuate sections 14. The arcuate sections 14 of the first locating ring 12a are rotated relative to the arcuate sections 14 of the second locating ring 12b, such that joints between adjacent arcuate sections 14 of the first locating ring 12a are not aligned with the joints of the second locating ring 12b. Adjacent arcuate sections 14 of the first locating ring 12a are connected to one another by passing a connector, such as a pin, screw or rivet, through an adjacent end of each of the adjacent arcuate sections 14 and into the second locating ring 12b. The connection of the adjacent arcuate sections 14 to the second locating ring 12b locks the arcuate sections 14 together. Similarly, the arcuate sections 14 of the second locating ring 12b are connected via the first locating ring 12a using connectors 16.

Each of the first and second locating rings 12a, 12b has a plurality of recesses 18 spaced around the circumference of the ring. As shown, each arcuate section 14 may have four recesses 18 formed in it. The recesses 18 of the first and second locating rings 12a, 12b are located so that when the first and second locating rings 12a, 12b are connected to one another using the connectors 16, the recesses 18 of the first locating ring 12a are aligned with the recesses 18 of the second locating ring 12b.

Figure 2:
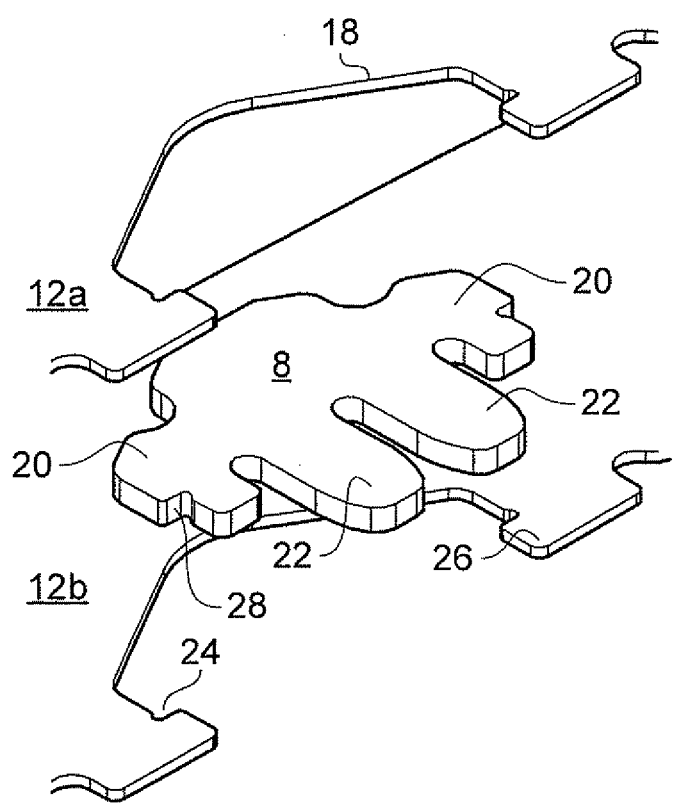
FIG. 2 is an enlarged perspective view of a sacrificial connector of the masking assembly.

The recesses 18 are shaped to receive the sacrificial connectors 8. As shown in FIG. 2, each sacrificial connector 8 comprises a pair of lateral shoulders 20 which protrude from each side of the sacrificial connector 8. Each sacrificial connector 8 further comprises a pair of legs 22 extending from between the shoulders 20. An indentation 24 is formed in each side of the recesses 18. The indentations 24 are defined by a pair of shoulders 26 located at the opening to each recess 18. The indentations 24 are complementary to the shoulders 20 of the sacrificial connectors 8. In use, the shoulders 20 of the sacrificial connectors are received within the indentations 24 with an end surface 28 of each shoulder 20 abutting a respective shoulder 26 of the recess 18.

Figure 3:
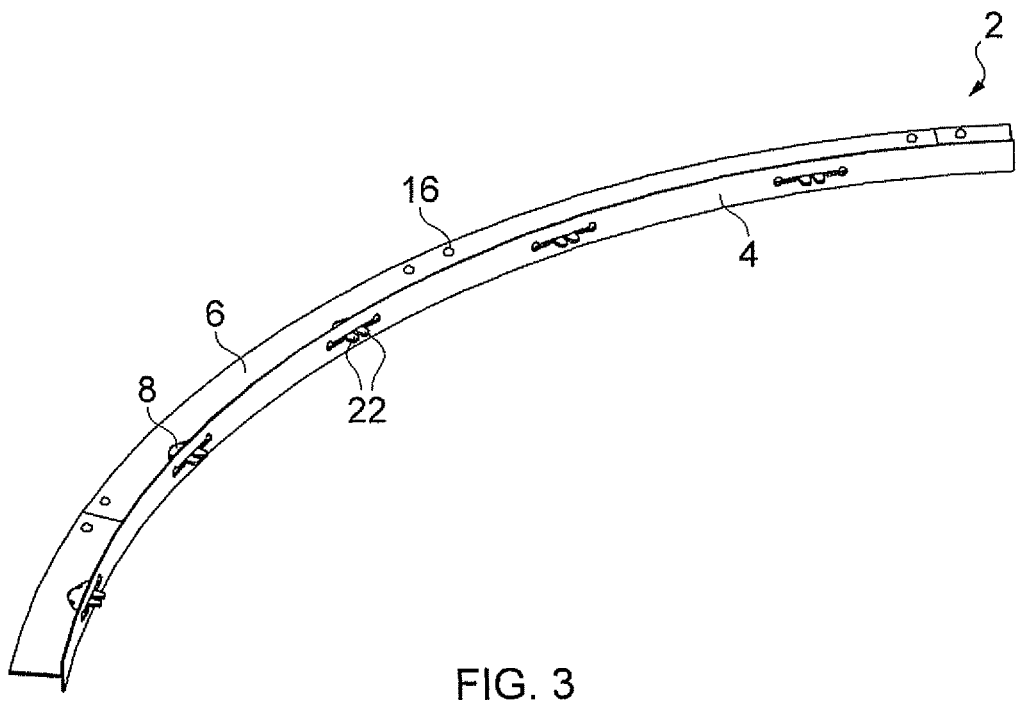
FIG. 3 is a perspective view of the masking apparatus during assembly.
Figure 4:
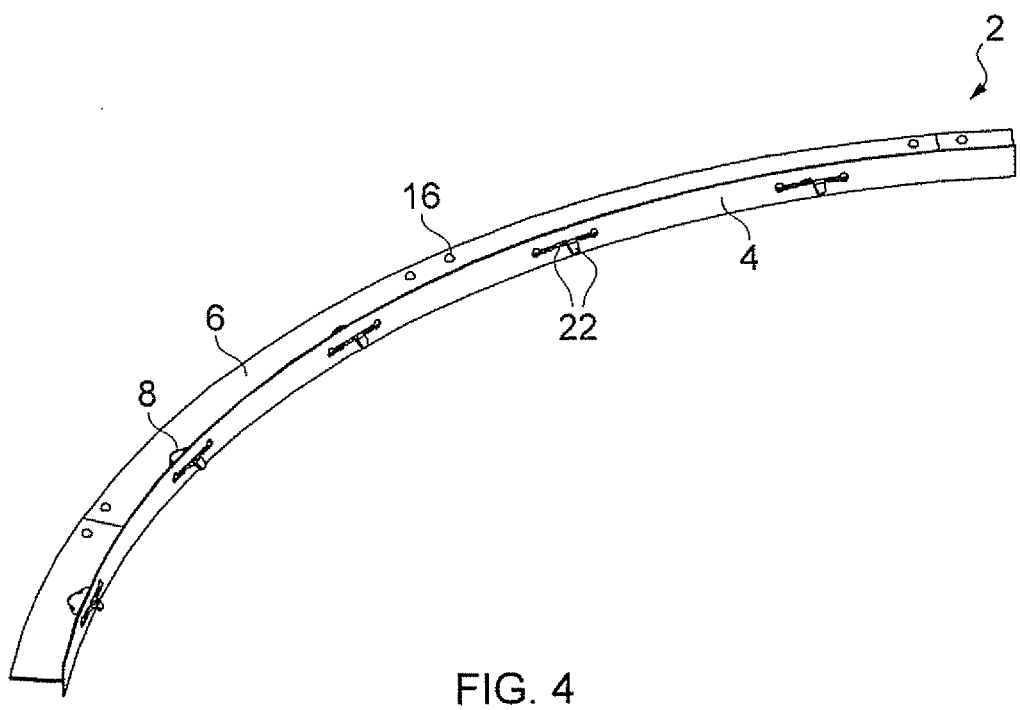
FIG. 4 is a perspective view of the masking apparatus after assembly.

As shown in FIG. 3, the legs 22 of each sacrificial connector 8 are received through one of the slots 10 in the sacrificial masking element 4 with the legs in an unlocked position where they lie in the plane of the remainder of the sacrificial connector 8. The legs 22 may then be deformed from the unlocked position to a locked position to connect the masking element to the locating jig 6 and to prevent disengagement. This is achieved by bending the legs 22 over towards the masking element 4 so that they no longer lie in both the plane of the remainder of the sacrificial connector 8 and the plane of the slots 10 of the sacrificial masking element 4. As shown in FIG. 4, one leg 22 may be bent downwards and the other leg 22 may be bent upwards. In doing so, the end surface 28 of each shoulder 20 of the sacrificial connector 8 is urged into contact with each shoulder 26 of the recess 18. This locks the shoulder 26 of the recess 18 between the end surface 28 of the sacrificial connector 8 and the sacrificial masking element 4. Consequently, the locating jig 6 is locked to the sacrificial connector 8, which is in turn locked to the sacrificial masking element 4. The legs 22 are preferably deformed by hand or using readily available tools, such as pliers.

In use, the masking apparatus 2 may be used to mask a portion of a component, such as a combustor ring 30, from the application of a thermal barrier coating. The combustor ring 30 has a circular cross-section which has a widened portion at one end. Accordingly, the combustor ring 30 has a narrow end 32 and a wide end 34. The combustor ring 30 has a circumferential portion 36 at both the narrow end 32 and wide end 34 which must remain uncoated.

As shown in FIG. 5, a plurality of combustor rings 30 are stacked on top of one another. The combustor rings 30 are arranged so that adjacent combustor rings 30 have their like-ends adjacent to one another (i.e. the wide end 34 of one combustor ring 30 is adjacent to the wide end 34 of the next combustor ring 30 in the stack, and the narrow end 32 of one combustor ring 30 is adjacent to the narrow end 32 of the next combustor ring 30 in the stack).

A masking apparatus 2 is disposed between adjacent combustor rings 30. The masking apparatus 2 is provided in two different diameters; one sized for masking the wide ends 34 of adjacent combustor rings 30 and the other sized for masking the narrow ends 32 of adjacent combustor rings 30. The outer ring 5b of the sacrificial masking element 4 contacts the circumferential portion 36 of the adjacent combustor rings 30 which centralises the masking apparatus in the combustor rings 30. Consequently, the inner ring 5a is spaced away from the circumferential portion 36 and a gap is left between the inner ring 5a and the circumferential portion 36 where the inner ring 5a overhangs the outer ring 5b. The locating jig 6 is sandwiched between radial surfaces of the adjacent combustor rings 30 which correctly aligns the masking apparatus 2 in an axial direction so that the inner ring 5a fully covers the circumferential portion 36 which should remain uncoated.

A spray nozzle (not shown) is located at a centre of the combustor rings 30 and is translatable in an axial direction along a path 38 from the combustor ring 30 at the bottom of the stack to the combustor ring 30 at the top of the stack. The spray nozzle has a number of discrete positions 40 which are each aligned with one of the combustor rings 30. In these positions 40 the spray nozzle can apply the thermal barrier coating to the combustor ring 30 over a region between the circumferential portion 36 at the narrow end 32 and the circumferential portion 36 at the wide end 34. The stack of combustor rings 30 are located on a rotary table (not shown) and the spray nozzle sprays the thermal barrier coating onto the combustor rings 30 whilst they are being rotated by the rotary table. This ensures that the whole circumference of the combustor rings 30 is coated. This is repeated for each position 40 of the spray nozzle so as to coat every one of the combustor rings 30.

The spray nozzle ejects a thermal barrier coating in a radial direction with little or no spread. Consequently, the inner ring 5b of the sacrificial masking element 4 casts a shadow over the circumferential portion 36. The sacrificial masking element 4 therefore prevents the thermal barrier coating from contacting the circumferential portion 36.

Furthermore, as the outer ring 5b spaces the inner ring 5a away from the circumferential portion 36, the coating does not create a continuous film between the inner ring 5a and the combustor ring 30, which would otherwise cause the sacrificial masking element 4 to become joined to the combustor ring 30, thus hindering disassembly of the stack of combustor rings 30.

Once all of the combustor rings 30 have been coated, they may be easily disassembled, simply by unstacking the combustor rings 30 and removing the masking apparatuses 2. The sacrificial masking element 4 can then by disconnected from the locating jig 6 by bending the legs 22 of the sacrificial connectors 8 back from the locked position to the unlocked position where the legs 22 lie in the plane of the slots 10 of the sacrificial masking element 4. This also releases the sacrificial connectors 8 from the locating jig 6. The sacrificial masking element 4 and/or sacrificial connectors 8 may then be replaced before the next thermal barrier coating operation.

Although the masking apparatus 2 has been described with reference to combustor rings 30, it may be used to mask other components. Such components are not limited to circular components. Accordingly, the sacrificial masking element 4 and locating jig 6 need not be circular, but instead may be appropriately configured for the component for which it is intended to mask.

Furthermore, it is not necessary for the masking apparatus 2 to be disposed between adjacent components. The locating jig 6 of the masking apparatus 2 may instead rest on a top or bottom surface of a single component. The weight of the component forces the locating jig 6 against the bottom surface. The locating jig 6 may be fixed to the top surface of the component using a weight or clamping arrangement to ensure that it does not move.

Although the inner ring 5a has been described as overhanging the outer ring 5b on either side, it may only overhang on one side of the outer ring 5b. Furthermore, the inner ring 5a need not be ring shaped and may instead be configured to mask the desired portion of the component. For example, where it is desired that the portion to be masked has a crenulated edge, the inner ring 5a may have a correspondingly shaped edge to provide such a shadow over the component.

The sacrificial masking element 4 and sacrificial connectors 8 may be discarded after every thermal barrier coating operation or may be used for several separate operations. The sacrificial masking element 4 and sacrificial connectors 8 are intended to be replaced more frequently that the locating jig 6.

The masking apparatus 2 is not limited to providing a mask from a thermal barrier coating, as described above. The masking apparatus 2 may mask a component from other coatings which are sprayed, such as paint. Furthermore, the masking apparatus 2 could be used as a sacrificial beam stopper in electron beam welding or laser trimming operations. The sacrificial masking element 4 may be formed from a material which is suitable for the intended purpose of the masking apparatus 2. For example, where the sacrificial masking element 4 is used as a beam stopper, it may be made from iron and have an appropriate thickness to prevent the beam from penetrating through the sacrificial masking element 4.

The invention claimed is:

1. A masking apparatus, the apparatus comprising:
   a sacrificial masking element for masking a portion of a component; and
   a locating jig detachably connectable to the sacrificial masking element and configured to position the sacrificial masking element over the portion of the component, wherein
   the locating jig is detachably connectable to the sacrificial masking element via a sacrificial connector, and
   the sacrificial connector is detachable from the sacrificial masking element and comprises a deformable portion, which is insertable through the sacrificial masking element from a first side of the sacrificial masking element to a second side of the sacrificial masking element and deformable on the second side from an unlocked position to a locked position to lock the sacrificial masking element to the locating jig.

2. The masking apparatus as claimed in claim 1, wherein the locating jig comprises a hole or slot configured to receive the sacrificial connector.

3. The masking apparatus as claimed in claim 1, wherein the deformable portion comprises a pair of legs which are bendable between the unlocked position and the locked position.

4. The masking apparatus as claimed in claim 1, wherein the locating jig comprises a recess configured to receive the sacrificial connector.

5. The masking apparatus as claimed in claim 4, wherein the recess comprises a shoulder which abuts an end surface of a shoulder of the sacrificial connector, and wherein the shoulder of the recess is fixed between the shoulder of the sacrificial connector and the sacrificial masking element when the sacrificial connector is in the locked position.

6. The masking apparatus as claimed in claim 1, wherein
the sacrificial masking element comprises a first layer and a second layer, the first layer being disposed against the component and the second layer being spaced away from the component by the first layer, and
the second layer protrudes over an edge of the first layer and thus defines an extent of the masked portion of the component.

7. The masking apparatus as claimed in claim 1, wherein the sacrificial masking element is substantially perpendicular to the locating jig.

8. The masking apparatus as claimed in claim 1, wherein the locating jig and sacrificial masking element are cylindrical.

9. The masking apparatus as claimed in claim 8, wherein the locating jig comprises a plurality of arcuate sections.

10. The masking apparatus as claimed in claim 9, wherein the locating jig comprises first and second layers of arcuate sections which are rotationally offset from one another and connected to one another.

* * * * *